June 14, 1938.  H. C. WATSON  2,120,383
PULLEY
Filed Sept. 4, 1936  2 Sheets-Sheet 1
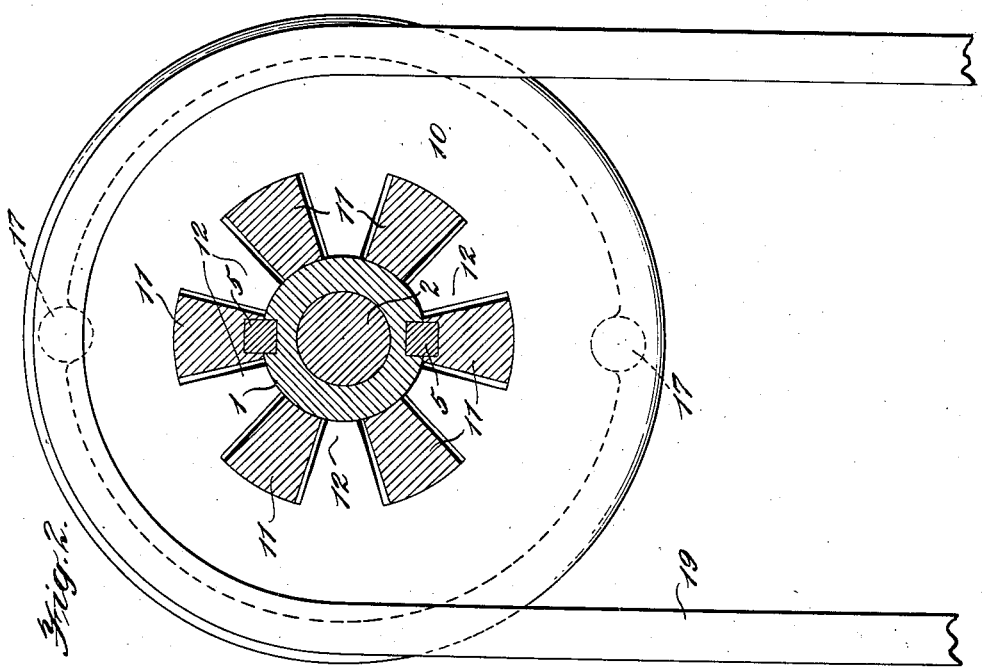
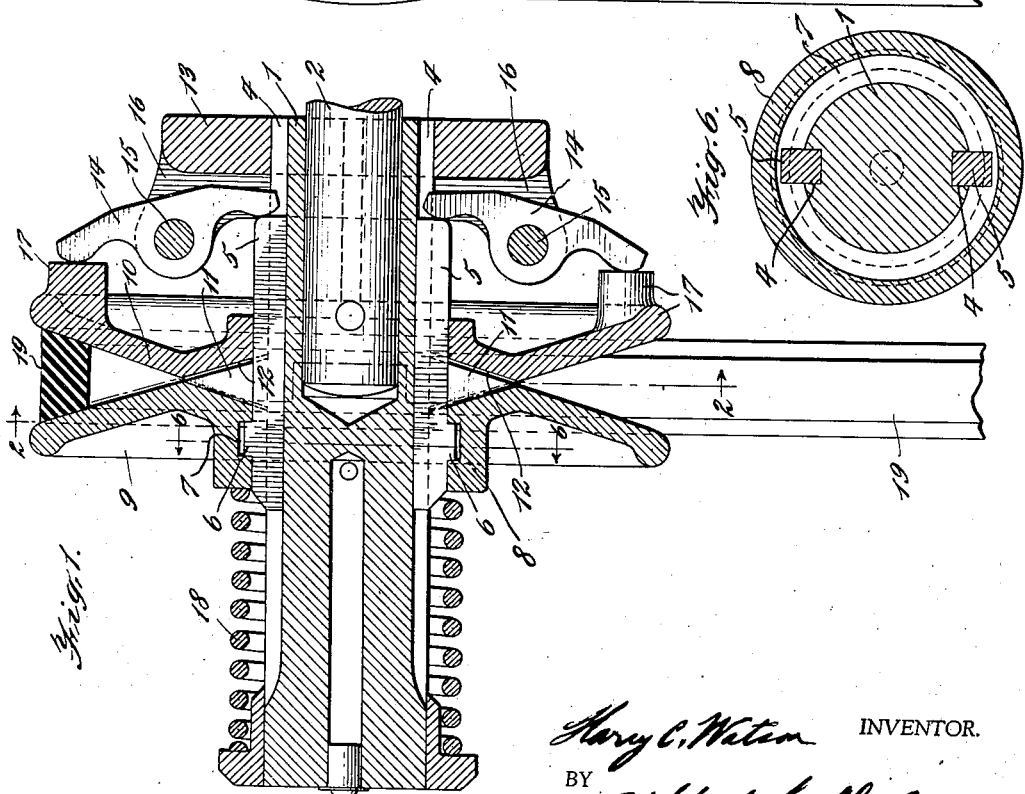
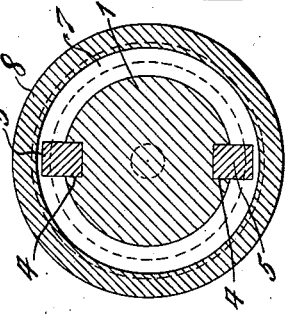
INVENTOR.
Harry C. Watson
BY
Gifford, Scull & Burgess
ATTORNEYS.

June 14, 1938.    H. C. WATSON    2,120,383
PULLEY
Filed Sept. 4, 1936    2 Sheets-Sheet 2
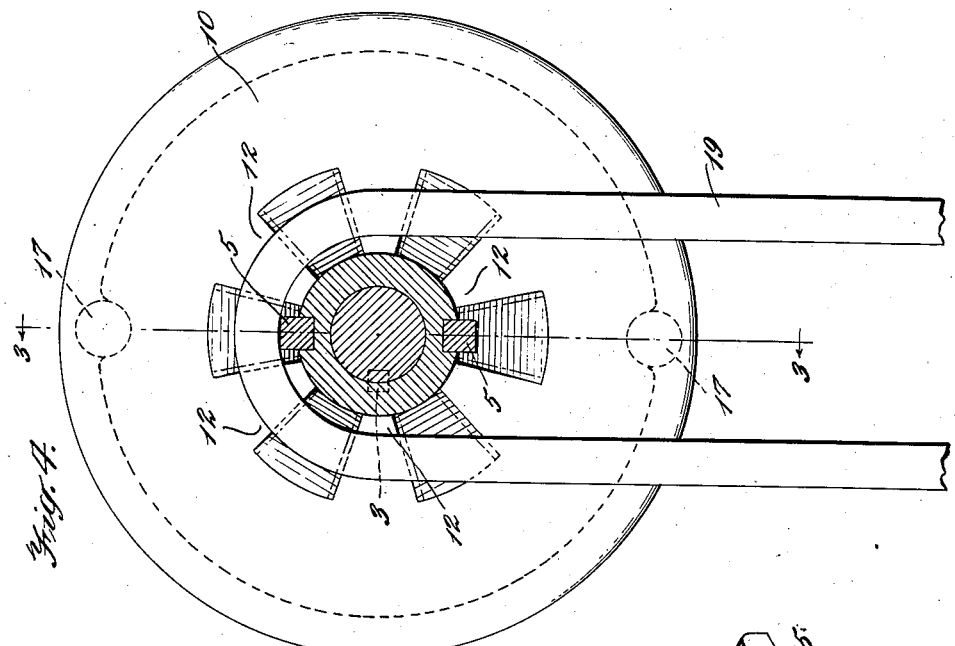
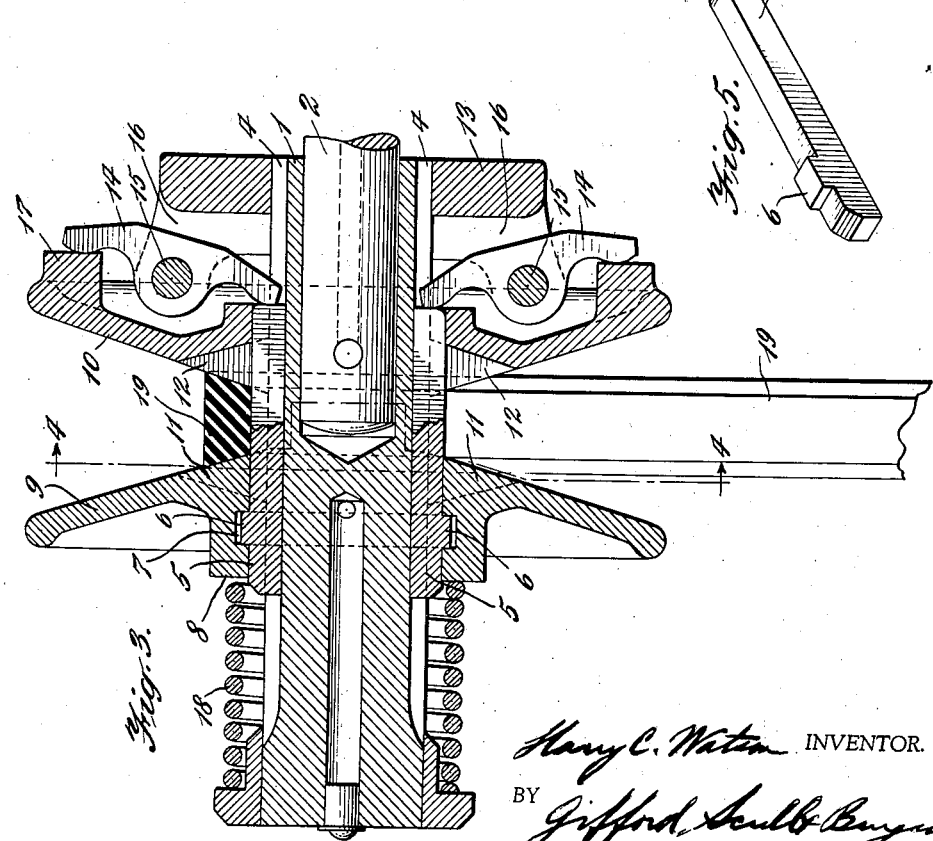

Patented June 14, 1938

2,120,383

UNITED STATES PATENT OFFICE 2,120,383

PULLEY

Harry C. Watson, Chicago, Ill., assignor to American Electric Fusion Corporation, Chicago, Ill., a corporation of Illinois Application September 4, 1936, Serial No. 99,413

5 Claims. (Cl. 74—230.17)

This invention relates to a novel and improved form of pulley, the novel features of which will be best understood from the following description and the annexed drawings, in which I have shown a selected embodiment of the invention and in which:

Fig. 1 is a longitudinal section through a shaft having a pulley applied thereto;

Fig. 2 is a section approximately on the line 2—2 of Fig. 1;

Fig. 3 is a view corresponding to Fig. 1 but showing the parts in different positions;

Fig. 4 is a section approximately on the line 4—4 of Fig. 3;

Fig. 5 is a perspective view of one of the keys appearing in the other figures;

Fig. 6 is a section approximately on the line 6—6 of Fig. 1.

The invention is shown as being used in connection with a shaft 1 which may be secured to a motor shaft 2, as in the copending application of Edmund J. von Henke, Ser. No. 99,219, filed September 3, 1936. The two shafts 1 and 2 are keyed together at 3 so that they are in effect one shaft.

The shaft 1 is shown as being provided with two diametrically opposed keyways 4 in which slide keys 5, the construction of which will probably be best understood from Fig. 5. Each one of these keys may slide freely lengthwise of the shaft, but rotates therewith and is provided with a circumferentially extending key 6 adapted to be received in a circumferential groove 7 in the hub 8 of one flange 9 of the pulley, whereby the flange 9 will move with the key 5 lengthwise of the shaft.

Cooperating with the flange 9 is a separate flange 10 which together form the pulley, and both flanges 9 and 10 are keyed to the shaft to rotate therewith by means of the keys 5, as plainly shown in Figs. 2 and 4. The two flanges are provided with recesses, forming between them overlapping teeth 11 and 12, each of which is adapted to enter a recess on the other flange. These teeth also may be used, if desired, to cause the two flanges to rotate together, although ordinarily the keyed connections to the shaft described above will be sufficient and therefore I have shown in the drawings that the teeth 11 and 12 are not in engagement. However, the overlapping relation of these teeth will permit the two flanges to be brought close together, as seen in Fig. 1.

Secured to the shaft 1 is a collar 13 having pivoted thereon a plurality of levers 14, each pivoted between its ends. The pivot 15 for each lever is shown as being on an ear 16, and one end of the lever contacts with a bearing 17 on the flange 10, while the other end bears against one end of the key 5.

The two flanges are normally urged together by means of a compression spring 18, and therefore a belt 19 which may run over the pulley will be driven thereby or may drive the pulley, as the case may be, and may occupy some such position as shown in Figs. 1 and 2. Assuming, however, that for any reason at all the tension on the belt increases, then the two flanges 9 and 10 will be moved in opposite directions away from each other. The two lever arms of each lever 14 are equal so that, as the flange 10 moves towards the right, that movement will impart an equal movement in the opposite direction to the keys 5, which in turn will force the flange 9 to the left against the action of the spring 18. If, for any reason, the tension on the belt increases, then these movements will be reversed so that the two flanges will be moved towards each other by equal amounts.

By the above arrangement, it will be seen that the belt 19 is always maintained in the same position lengthwise of the shaft. This is important where, for example, the pulley is used to drive some piece of machinery and where a displacement of the belt lengthwise of the shaft would not be accompanied by a like displacement of the belt along the driven shaft. In other words, the belt is always maintained in line, no matter what may be the driving diameter of the pulley. The diameter of the pulley may vary between that shown in Fig. 1 and that shown in Fig. 3, but the belt always occupies the same position as measured lengthwise of the shaft.

While I have shown the invention as embodied in a specific form, it is to be understood that various changes in details may be made without departing from the scope of the invention, as defined by the appended claims.

I claim:

1. In combination, a shaft having a key movable lengthwise thereof, a pulley on said shaft and formed of two separate flanges, means causing said flanges to rotate together, one of said flanges being movable with said key and the second movable with respect to the key lengthwise of the shaft, and means actuated by movement of said second flange lengthwise of the shaft, to cause movement of the key and the first-named flange in the opposite direction.

2. In combination, a shaft, a pulley on said shaft and formed of two separate flanges, a key slidable lengthwise of said shaft, a circumferential key connecting said slidable key and one of said flanges, a lever engaged by the second flange and adapted, upon movement of said second flange away from the first-named flange, to move said slidable key and said first-named flange an equal amount in the opposite direction, and means yieldingly resisting said movements.

3. In combination, a shaft, a pulley on said shaft and formed of two separate flanges, a key slidable lengthwise of said shaft but rotatable therewith, a circumferential key connecting said slidable key and one of said flanges, a lever engaged by the second flange and adapted, upon movement of said second flange away from the first-named flange, to move said slidable key and said first-named flange an equal amount in the opposite direction, and means yieldingly resisting said movements.

4. In combination, a shaft, a pulley on said shaft and formed of two separate flanges, a key slidable lengthwise of said shaft but rotatable therewith, a circumferential key connecting said slidable key and one of said flanges, a lever engaged by the second flange and adapted, upon movement of said second flange away from the first-named flange, to move said slidable key and said first-named flange an equal amount in the opposite direction, a spring resisting said movements, and means causing said flanges to rotate in unison with each other.

5. In combination, a shaft, a pulley on said shaft and comprising two separate flanges each keyed to the shaft to rotate therewith but movable axially thereof, means yieldingly urging said flanges towards each other, a collar secured to said shaft adjacent one of said flanges, a lever pivoted midway of its ends on said collar and having one end engaging said adjacent flange, and a key slidable along said shaft and connected to the other flange and engaging the other end of said lever, whereby movement of said adjacent flange away from the other flange causes an equal and opposite movement of said other flange.

HARRY C. WATSON.